(12) United States Patent
Kim et al.

(10) Patent No.: US 9,176,339 B2
(45) Date of Patent: Nov. 3, 2015

(54) LIQUID CRYSTAL DISPLAY DEVICE (75) Inventors: Sang Ho Kim, Paju-si (KR); Yong Min Ha, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 13/184,341

(22) Filed: Jul. 15, 2011

(65) Prior Publication Data
US 2012/0019748 A1 Jan. 26, 2012

(30) Foreign Application Priority Data
Jul. 21, 2010 (KR) .......................... 10-2010-0070461

(51) Int. Cl.
*G02F 1/1335* (2006.01)
*G02F 1/1339* (2006.01)

(52) U.S. Cl.
CPC ...... *G02F 1/133512* (2013.01); *G02F 1/13394* (2013.01); *G02F 2001/13396* (2013.01)

(58) Field of Classification Search
CPC .................. G02F 2001/13396; G02F 1/13394; G02F 1/133512
USPC ........................... 349/155–157, 110–111, 141
See application file for complete search history.

(56) References Cited

U.S. PATENT DOCUMENTS

| | | |
|---|---|---|
| 2002/0113936 A1 | 8/2002 | Yanagawa et al. |
| 2002/0171800 A1 | 11/2002 | Miyazaki et al. |
| 2005/0237470 A1 | 10/2005 | Kadotani |
| 2006/0209245 A1 | 9/2006 | Mun et al. |
| 2006/0227276 A1* | 10/2006 | Son ............................... 349/141 |
| 2006/0246360 A1 | 11/2006 | Hwang |
| 2007/0024775 A1 | 2/2007 | Lee et al. |
| 2007/0165179 A1* | 7/2007 | Jang ............................... 349/156 |
| 2007/0281223 A1* | 12/2007 | Mochizuki ......................... 430/5 |
| 2008/0309838 A1* | 12/2008 | Fukuoka et al. ................. 349/39 |
| 2009/0086134 A1 | 4/2009 | Yao et al. |
| 2009/0219471 A1* | 9/2009 | Mochiku ....................... 349/110 |
| 2010/0302496 A1 | 12/2010 | Zhao |

FOREIGN PATENT DOCUMENTS

| | | |
|---|---|---|
| CN | 1904702 A | 1/2007 |
| CN | 101398562 A | 4/2009 |
| CN | 101900911 A | 12/2010 |
| KR | 10-2006-0066271 A | 6/2006 |
| KR | 10-0708617 B1 | 4/2007 |
| KR | 10-0793357 B1 | 1/2008 |

OTHER PUBLICATIONS

Machine Translation of KR10200600066271.*

* cited by examiner

*Primary Examiner* — Richard Kim
*Assistant Examiner* — Kendrick Hsu
(74) *Attorney, Agent, or Firm* — Birch, Stewart, Kolasch & Birch, LLP (57) ABSTRACT

A liquid crystal display device is discussed, which includes a first substrate and a second substrate, which face each other; a liquid crystal layer formed between the first substrate and the second substrate; and a column spacer formed between the first substrate and the second substrate, wherein the column spacer is formed within a light-shielding region on the first substrate or the second substrate, and a width of the light-shielding region in the periphery of the column spacer is greater than that of the light-shielding region where the column spacer is not formed. Since the width of the light-shielding region in the periphery of the column spacer is greater than that of the light-shielding region where the column spacer is not formed, even though an alignment film is damaged by the column spacer, light leakage can be prevented from occurring at the damaged portion.

3 Claims, 8 Drawing Sheets

LIQUID CRYSTAL DISPLAY DEVICE

CROSS REFERENCE TO RELATED APPLICATIONS

This application claims the benefit of the Korean Patent Application No. 10-2010-0070461 filed on Jul. 21, 2010, which is hereby incorporated by reference for all purposes as if fully set forth herein.

BACKGROUND OF THE INVENTION

1. Field of the Invention

The present invention relates to a liquid crystal display device, and more particularly, to a liquid crystal display device that can prevent light leakage from occurring.

2. Discussion of the Related Art

A liquid crystal display device is widely used in various fields of notebook computers, monitors, spacecraft, aircraft, and etc. owing to advantages of low power consumption based on a low driving voltage and portability.

The liquid crystal display device includes a lower substrate, an upper substrate, and a liquid crystal layer between the lower and upper substrates. In the liquid crystal display device, an alignment state of liquid crystal molecules is controlled based on whether or not an electric field is applied thereto, and light transmittance is controlled according to the alignment state of liquid crystal molecules, whereby images are displayed thereon.

Hereinafter, a related art liquid crystal display device will be described with reference to the accompanying drawings.

Figure 1:
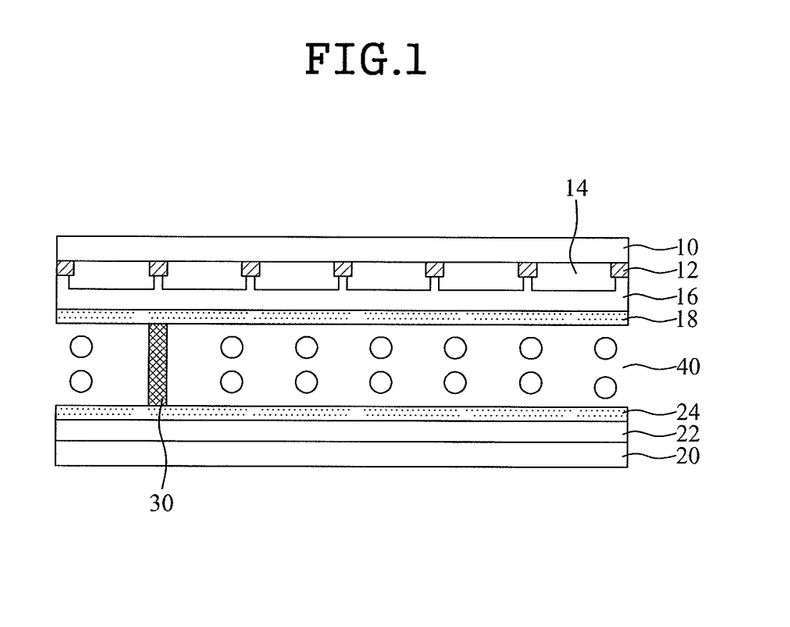
FIG. 1 is a cross-sectional view illustrating the related art liquid crystal display device.

FIG. 1 is a cross-sectional view illustrating the related art liquid crystal display device.

The related art liquid crystal display device includes an upper substrate 10, a lower substrate 20, a column spacer 30, and a liquid crystal layer 40.

Black matrixes 12 are formed on the upper substrate 10, and a color filter 14 is formed between the black matrixes 12. An overcoat layer 16 is formed on the color filter 14, and an upper alignment film 18 is formed on the overcoat layer 16.

A device layer 22 including a thin film transistor, a pixel electrode, and a common electrode is formed on the lower substrate 20, and a lower alignment film 24 is formed on the device layer 22.

The column spacer 30 is formed between the upper substrate 10 and the lower substrate 20 to maintain a cell gap of the liquid crystal display device.

The liquid crystal layer 40 is formed between the upper substrate 10 and the lower substrate 20. The liquid crystal layer 40 is arranged depending on an alignment direction of the upper alignment film 18 and the lower alignment film 24 in a state that no electric field is applied between the pixel electrode and the common electrode. An alignment direction of the liquid crystal layer 40 is varied depending on an electric field direction in a state that an electric field is applied between the pixel electrode and the common electrode.

In the aforementioned related art liquid crystal display device, the upper alignment film 18 or the lower alignment film 24 is damaged by the column spacer 30, whereby the alignment direction of the liquid crystal layer 40 is varied. For this reason, a problem occurs in that light leakage is caused. This problem will now be described in more detail.

With the tendency of slimness of the liquid crystal display device, thicknesses of the upper substrate 10 and the lower substrate 20 have been gradually reduced. If the thicknesses of the upper substrate 10 and the lower substrate 20 are reduced, it is likely that the substrates get bent. If the substrates get bent, the column spacer 30 is pressurized and its position may be varied. In this case, the column spacer 30 may damage the upper alignment film 18 or the lower alignment film 24 while moving.

As described above, if the upper alignment film 18 or the lower alignment film 24 is damaged by the column spacer 30, an initial alignment direction of the liquid crystal layer 40 is varied at the damaged position. For this reason, light leakage occurs, whereby quality of the liquid crystal display device is deteriorated.

SUMMARY OF THE INVENTION

Accordingly, the present invention is directed to a liquid crystal display device which substantially obviates one or more problems due to limitations and disadvantages of the related art.

An advantage of the present invention is to provide a liquid crystal display device that can prevent light leakage from occurring at a damaged part even though an upper alignment film or a lower alignment film is damaged by a column spacer.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device comprises a first substrate and a second substrate, which face each other; a liquid crystal layer formed between the first substrate and the second substrate; and a column spacer formed between the first substrate and the second substrate, wherein the column spacer is formed within a light-shielding region on the first substrate or the second substrate, and a width of the light-shielding region in the periphery of the column spacer is greater than that of the light-shielding region where the column spacer is not formed.

In another aspect of the present invention, a liquid crystal display device comprises a first substrate and a second substrate, which face each other; a liquid crystal layer formed between the first substrate and the second substrate; and a column spacer formed between the first substrate and the second substrate, wherein the column spacer is formed within a light-shielding region on the first substrate or the second substrate, and a separate light-shielding layer is additionally formed in the periphery of a region where the column spacer is formed.

In other aspect of the present invention, a liquid crystal display device comprises a first substrate and a second substrate, which face each other; a liquid crystal layer formed between the first substrate and the second substrate; and a column spacer formed between the first substrate and the second substrate, wherein the first substrate or the second substrate includes a pixel region displaying a picture image by transmitting light and a light-shielding region formed between portions of the pixel region, the column spacer is formed within the light-shielding region on the first substrate or the second substrate, and an effective area of the pixel region adjacent to the column spacer is smaller than that of the pixel region which is not adjacent to the column spacer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Figure 2A:
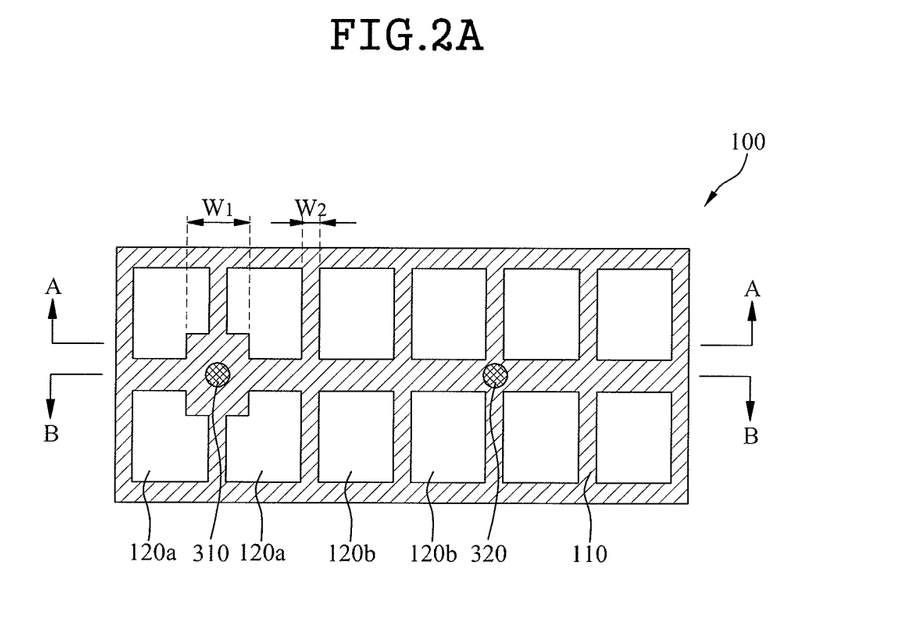
FIG. 2A is a plane view illustrating an upper substrate for a liquid crystal display device according to the first embodiment of the present invention.
Figure 2B:
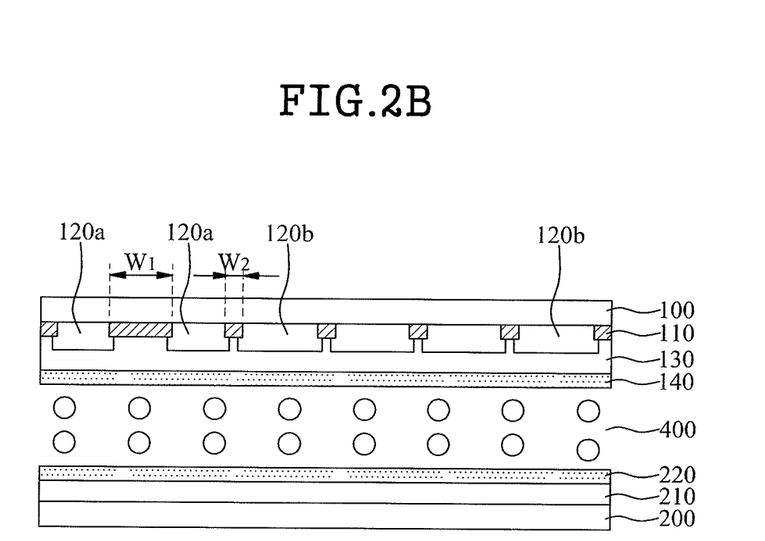
FIG. 2B is a cross-sectional view illustrating a liquid crystal display device corresponding to line A-A of FIG. 2A.
Figure 2C:
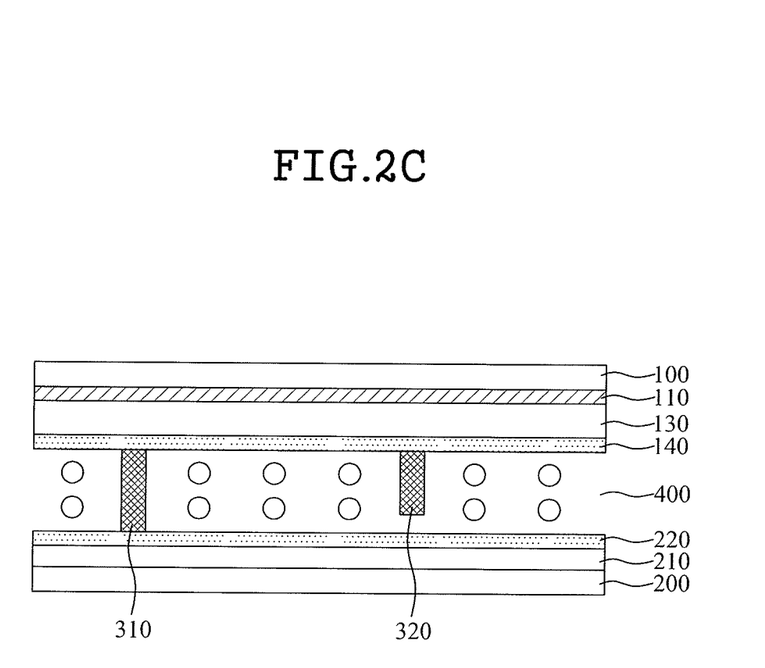
FIG. 2C is a cross-sectional view illustrating a liquid crystal display device corresponding to line B-B of FIG. 2A.

FIG. 2A is a plane view illustrating an upper substrate for a liquid crystal display device according to the first embodiment of the present invention, FIG. 2B is a cross-sectional view illustrating a liquid crystal display device corresponding to line A-A of FIG. 2A, and FIG. 2C is a cross-sectional view illustrating a liquid crystal display device corresponding to line B-B of FIG. 2A.

As shown in FIG. 2A to FIG. 2C, the liquid crystal display device according to the first embodiment of the present invention includes an upper substrate 100, a lower substrate 200, column spacers 310 and 320, and a liquid crystal layer 400.

Black matrix 110 is formed on the upper substrate 100, and color filters 120a and 120b are formed between the black matrix 110. An overcoat layer 130 is formed on the color filters 120a and 120b, and an upper alignment film 140 is formed on the overcoat layer 130.

The black matrix 110 serves to prevent light from leaking to a region other than a pixel region that displays an image, and is formed on the upper substrate 100 in a matrix pattern. The color filters 120a and 120b generally include red (R), green (G), or blue (B) filters to display various colors. The overcoat layer 130 is formed on the color filters 120a and 120b to flatten the substrates. The upper alignment film 140 is aligned in a predetermined direction to determine an initial alignment direction of the liquid crystal layer 400.

A device layer 210 is formed on the lower substrate 200, and a lower alignment film 220 is formed on the device layer 210.

The device layer 210 may include various elements such as a thin film transistor, a pixel electrode and a common electrode. The lower alignment film 220 determines the initial alignment direction of the liquid crystal layer 400 together with the upper alignment film 140.

The column spacers 310 and 320 are formed in a region of the black matrix 110. In other words, the column spacers 310 and 320 are formed in the region of the black matrix 110 where a picture image is not displayed, instead of a region of the color filters 120a and 120b where a picture image is displayed, so that an effective region where a picture image is displayed is not reduced in the liquid crystal display device.

The column spacers 310 and 320 include a main column spacer 310 and a sub column spacer 320. The main column spacer 310 is used to maintain a cell gap of the liquid crystal display device, and the sub column spacer 320 is used to prevent the liquid crystal layer from being concentrated on a specific region. For example, the sub column spacer 320 is used as a dam that prevents a gravity defect from occurring, wherein the gravity defect means that the liquid crystal layer is concentrated on a lower part of the liquid crystal display device by gravity.

Both the main column spacer 310 and the sub column spacer 320 are formed between the upper substrate 100 and the lower substrate 200. The main column spacer 310 is in contact with both the upper substrate 100 and the lower substrate 200 to maintain a cell gap, whereas the sub column spacer 320 is in contact with the upper substrate 100 but is not in contact with the lower substrate 200. Accordingly, it is not likely that the alignment films 140 and 220 may be damaged by the sub column spacer 320. The alignment films 140 and 220 are mainly damaged by the main column spacer 310.

In this respect, as shown in FIG. 2A, the black matrix 110 pattern in the periphery of the main column spacer 310 is different from the black matrix 110 pattern in the periphery of the sub column spacer 320. In other words, as described above, it is not likely that the alignment films 140 and 220 may be damaged by the sub column spacer 320. Accordingly, light leakage little occurs in the periphery of the sub column spacer 320 due to change of the alignment direction of the liquid crystal layer 400, whereby it is not required that a light-shielding region should be increased in the periphery of the sub column spacer 320. However, the alignment films 140 and 220 may be damaged by the main column spacer 310. For this reason, light leakage may occur in the periphery of the main column spacer 310 due to change of the alignment direction of the liquid crystal layer 400, whereby it is required that a light-shielding region should be increased in the periphery of the main column spacer 310.

Consequently, in the first embodiment of the present invention, in forming the light-shielding region, i.e., the black matrix 110, a pattern width W1 of the black matrix 110 in the periphery of the main column spacer 310 is greater than a pattern width W2 of the black matrix 110 corresponding to a region where the main column spacer 310 is not formed. In this case, the periphery of the main column spacer 310 means a region within a predetermined distance from the main column spacer 310, especially a region within a pixel adjacent to the main column spacer 310.

In this respect, an effective area of the color filter 120a adjacent to the main column spacer 310 is smaller than that of the color filter 120b which is not adjacent to the main column spacer 310. In other words, a pixel region that displays a image through light transmittance is not formed at the same pattern, and an effective area of the pixel region adjacent to the main column spacer 310 becomes smaller than that of the pixel region which is not adjacent to the main column spacer 310.

Figure 3A:
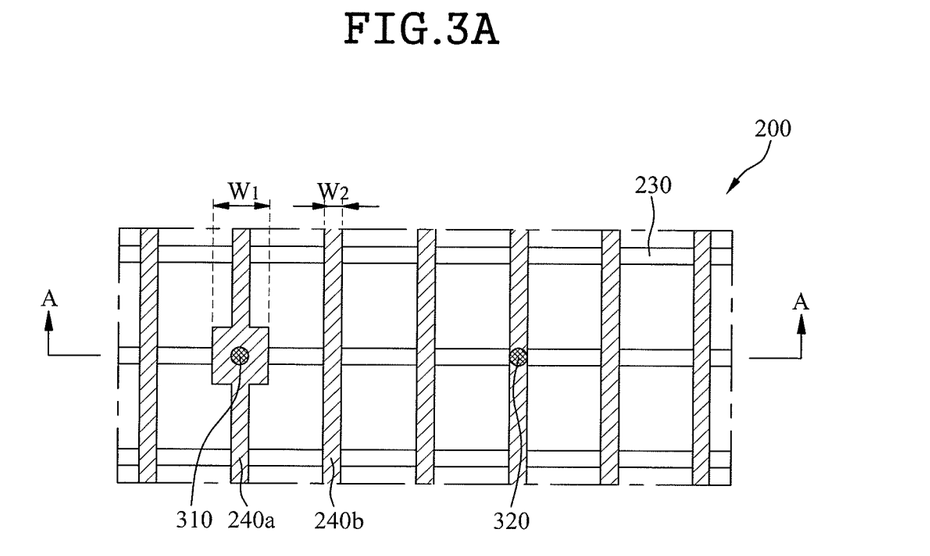
FIG. 3A is a plane view illustrating a lower substrate for a liquid crystal display device according to the second embodiment of the present invention.
Figure 3B:
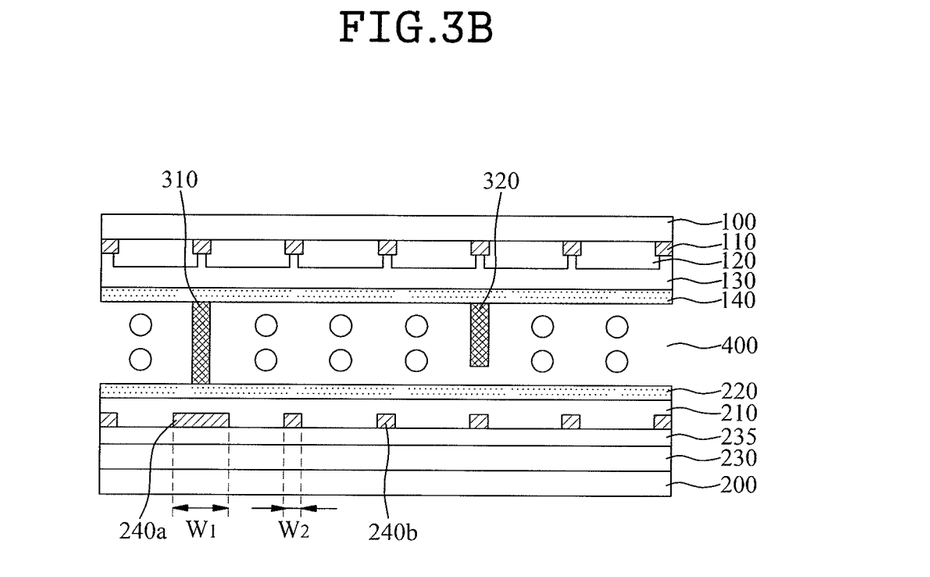
FIG. 3B is a cross-sectional view illustrating a liquid crystal display device corresponding to line A-A of FIG. 3A.

FIG. 3A is a plane view illustrating a lower substrate for a liquid crystal display device according to the second embodiment of the present invention, and FIG. 3B is a cross-sectional view illustrating a liquid crystal display device corresponding to line A-A of FIG. 3A.

As shown in FIG. 3A and FIG. 3B, the liquid crystal display device according to the second embodiment of the present invention includes an upper substrate 100, a lower substrate 200, column spacers 310 and 320, and a liquid crystal layer 400.

Black matrix 110 is formed on the upper substrate 100, and color filters 120 are formed between the black matrix 110. An overcoat layer 130 is formed on the color filters 120, and an upper alignment film 140 is formed on the overcoat layer 130.

A gate line 230 is formed on the lower substrate 200, and a gate insulating film 235 is formed on the gate line 230. Data lines 240a and 240b are formed on the gate insulating film 235, and a device layer 210 is formed on the data lines 240a and 240b. A lower alignment film 220 is formed on the device layer 210.

The gate line 230 is arranged to cross the data lines 240a and 240b, thereby defining a pixel region. The gate line 230 is insulated from the data lines 240a and 240b by the gate insulating film 235.

The column spacers 310 and 320 are formed in a region of the data lines 240a and 240b. Particularly, although the column spacers 310 and 320 are formed in the portion where the gate line 230 crosses the data lines 240a and 240b in FIG. 3A, the position of the column spacers 310 and 320 is not limited to the example of FIG. 3A. The column spacers 310 and 320 may be formed in a region of the data lines 240 and 240b which do not cross the gate line 230.

As described above, the column spacers 310 and 320 are formed in the region of the data lines 240a and 240b corresponding to a light-shielding region where a image is not displayed, instead of the pixel region that displays a image, whereby an effective region where a image is displayed is not reduced in the liquid crystal display device.

The column spacers 310 and 320 include a main column spacer 310 and a sub column spacer 320. As shown in FIG. 3A, a pattern of the data line 240a in the periphery of the main column spacer 310 is different from that of the data line 240b in the periphery of the sub column spacer 320.

In other words, in the same manner as the aforementioned embodiment, it is hardly required that the light-shielding region should be increased in the periphery of the sub column spacer 320. However, it is necessarily required that the light-shielding region should be increased in the periphery of the main column spacer 310. Accordingly, in the second embodiment of the present invention, in forming the data lines 240a and 240b corresponding to the light-shielding region, a pattern width W1 of the data line 240a in the periphery of the main column spacer 310 is greater than a pattern width W2 of the data line 240b corresponding to a region where the main column spacer 310 is not formed. In this case, the effective area of the pixel region adjacent to the main column spacer 310 becomes smaller than that of the pixel region which is not adjacent to the main column spacer 310.

Figure 4A:
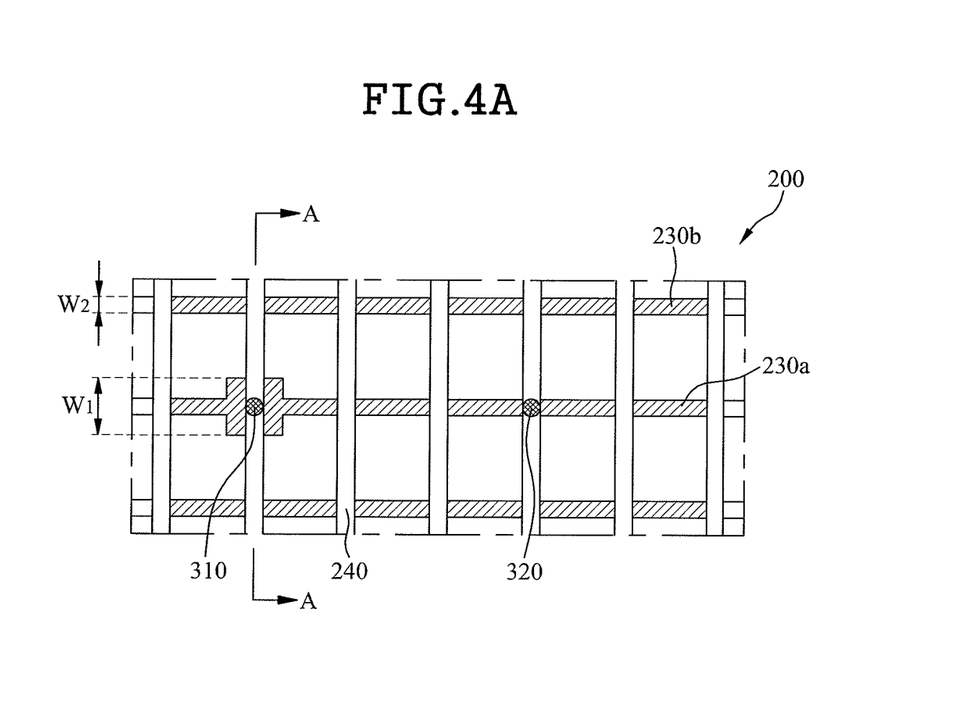
FIG. 4A is a plane view illustrating a lower substrate for a liquid crystal display device according to the third embodiment of the present invention.
Figure 4B:
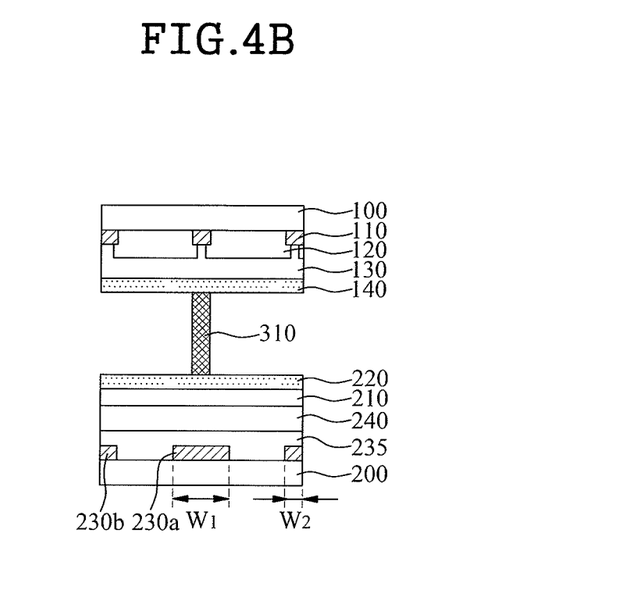
FIG. 4B is a cross-sectional view illustrating a liquid crystal display device corresponding to line A-A of FIG. 4A.

FIG. 4A is a plane view illustrating a lower substrate for a liquid crystal display device according to the third embodiment of the present invention, and FIG. 4B is a cross-sectional view illustrating a liquid crystal display device corresponding to line A-A of FIG. 4A.

As shown in FIG. 4A and FIG. 4B, the liquid crystal display device according to the third embodiment of the present invention includes an upper substrate 100, a lower substrate 200, column spacers 310 and 320, and a liquid crystal layer 400.

Black matrix 110 is formed on the upper substrate 100, and color filters 120 are formed between the black matrix 110. An overcoat layer 130 is formed on the color filters 120, and an upper alignment film 140 is formed on the overcoat layer 130.

Gate lines 230a and 230b are formed on the lower substrate 200, and a gate insulating film 235 is formed on the gate lines 230a and 230b. A data line 240 is formed on the gate insulating film 235, and a device layer 210 is formed on the data line 240. And, a lower alignment film 220 is formed on the device layer 210.

The gate lines 230a and 230b are arranged to cross the data line 240, thereby defining a pixel region. The gate lines 230a and 230b are insulated from the data line 240 by the gate insulating film 235.

The column spacers 310 and 320 are formed in a region of the gate lines 230a and 230b. Particularly, although the column spacers 310 and 320 are formed in the portion where the gate lines 230a and 230b cross the data line 240 in FIG. 4A, the position of the column spacers 310 and 320 is not limited to the example of FIG. 4A. The column spacers 310 and 320 may be formed in a region of the gate lines 230a and 230b which do not cross the data line 240.

As described above, the column spacers 310 and 320 are formed in the region of the gate lines 230a and 230b corresponding to a light-shielding region where a image is not displayed, instead of the pixel region that displays a image, whereby an effective region where a image is displayed is not reduced in the liquid crystal display device.

The column spacers 310 and 320 include a main column spacer 310 and a sub column spacer 320. As shown in FIG. 4A, a pattern of the gate line 230a in the periphery of the main column spacer 310 is different from that of the gate line 230b in the periphery of the sub column spacer 320.

In other words, in the third embodiment of the present invention, in forming the gate lines 230a and 230b corresponding to the light-shielding region, a pattern width W1 of the gate line 230a in the periphery of the main column spacer 310 is greater than a pattern width W2 of the gate line 230b corresponding to a region where the main column spacer 310 is not formed. In this case, the effective area of the pixel region adjacent to the main column spacer 310 becomes smaller than that of the pixel region which is not adjacent to the main column spacer 310.

Figure 5A:
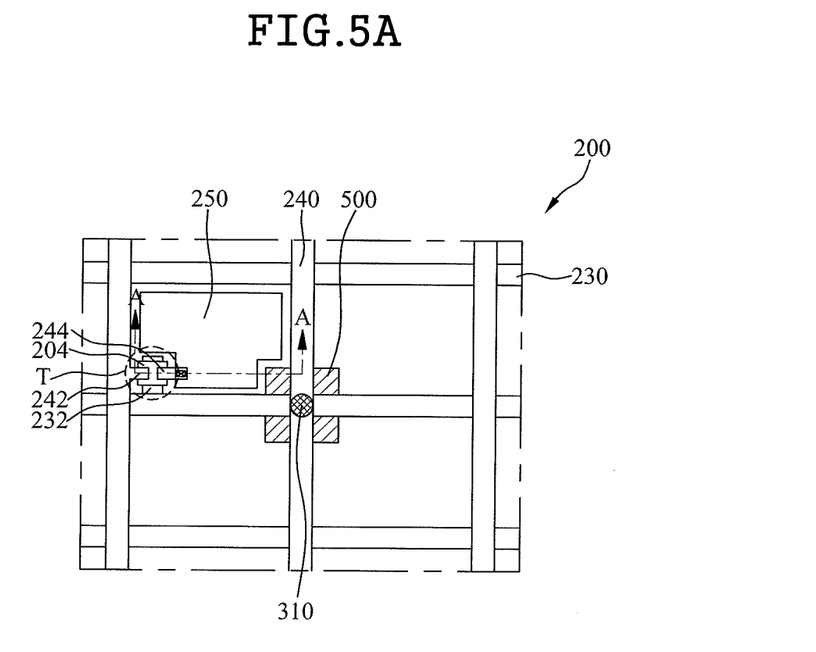
FIG. 5A is a plane view illustrating a lower substrate for a liquid crystal display device according to the fourth embodiment of the present invention.
Figure 5B:
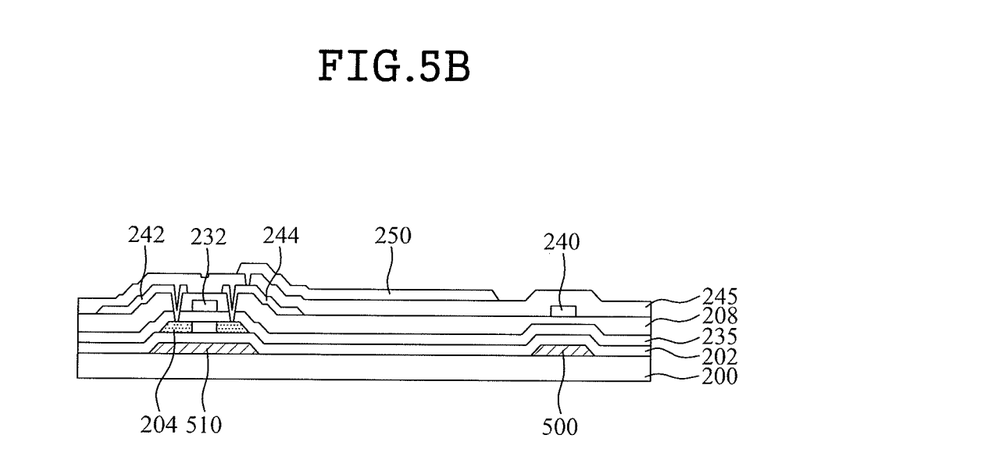
FIG. 5B is a cross-sectional view illustrating a liquid crystal display device corresponding to line A-A of FIG. 5A.

FIG. 5A is a plane view illustrating a lower substrate for a liquid crystal display device according to the fourth embodiment of the present invention, and FIG. 5B is a cross-sectional view illustrating a liquid crystal display device corresponding to line A-A of FIG. 5A.

In the same manner as the aforementioned embodiments, the liquid crystal display device according to the fourth embodiment of the present invention includes an upper substrate, a lower substrate, column spacers, and a liquid crystal layer. The upper substrate, the column spacers and the liquid crystal layer are formed in the same manner as those of the second or third embodiment. The lower substrate for the liquid crystal display device according to the fourth embodiment of the present invention will be described in detail with reference to FIGS. 5A and 5B.

As shown in FIG. 5A, on the lower substrate 200 for the liquid crystal display device according to the fourth embodiment of the present invention, a gate line 230 is arranged to cross a data line 240, thereby defining a pixel region. A thin film transistor T is formed to be connected with the gate line 230 and the data line 240, and a pixel electrode 250 electrically connected with the thin film transistor T is formed in the pixel region. The pixel electrode 250 may be formed in a finger structure. In this case, a common electrode arranged in parallel with the pixel electrode 250 of the finger structure is additionally formed in the pixel region, whereby an alignment direction of the liquid crystal layer can be controlled by a horizontal electric field between the pixel electrode 250 and the common electrode.

The main column spacer 310 is located in the portion where the gate line 230 crosses the data line 240, but not limited to that. That is, the main column spacer 310 may be formed in a region of the gate line 230, which does not cross the data line 240, or may be formed in a region of the data line 240, which does not cross the gate line 230.

A separate light-shielding layer 500 is formed in the periphery of the main column spacer 310. In other words, the separate light-shielding layer 500 is formed in the periphery of the main column spacer 310 to prevent light leakage from occurring by increasing the light-shielding region in the periphery of the main column spacer 310. In this case, the effective area of the pixel region adjacent to the main column spacer 310 becomes smaller than that of the pixel region which is not adjacent to the main column spacer 310.

Since the gate line 230 or the data line 240 where the main column spacer 310 is located also functions to be the light-shielding region, the light-shielding layer 500 can be formed in various patterns.

Figure 7A:
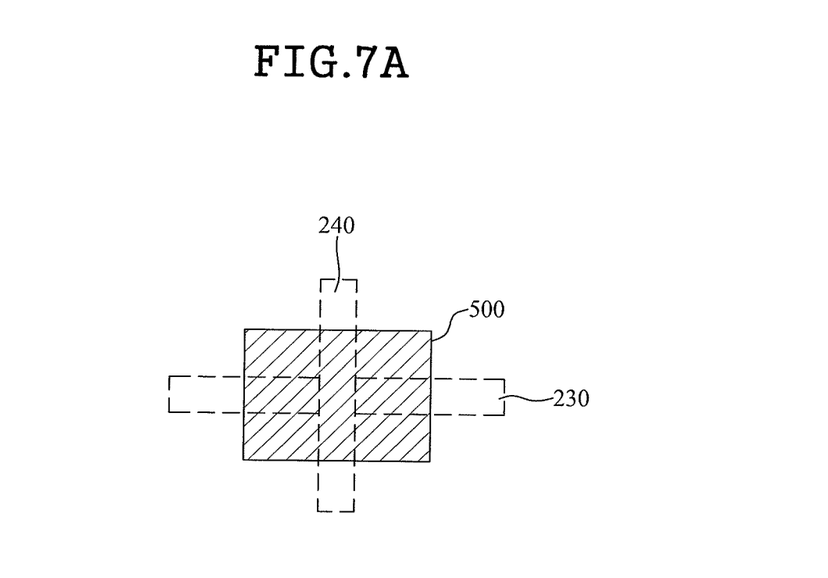
FIG. 7A to FIG. 7D are a plane view illustrating a light-shielding layer according to various embodiments of the present invention.
Figure 7B:
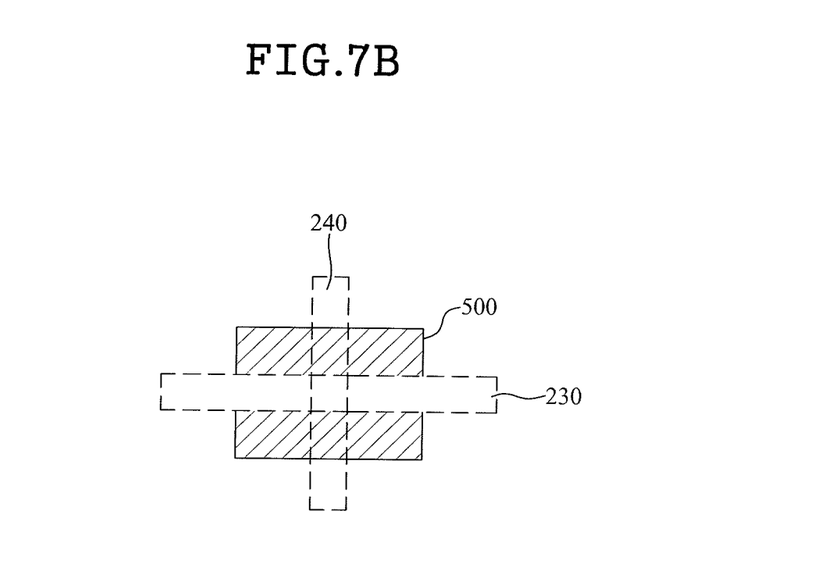
Figure 7C:
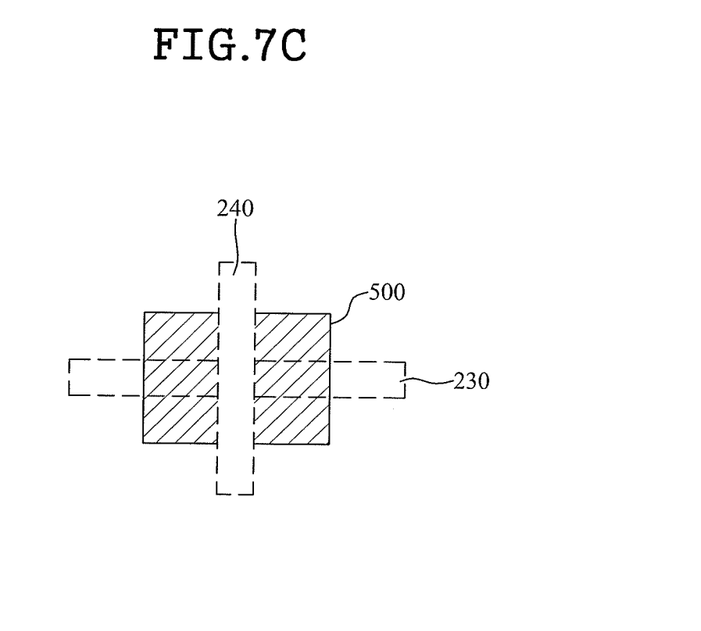
Figure 7D:
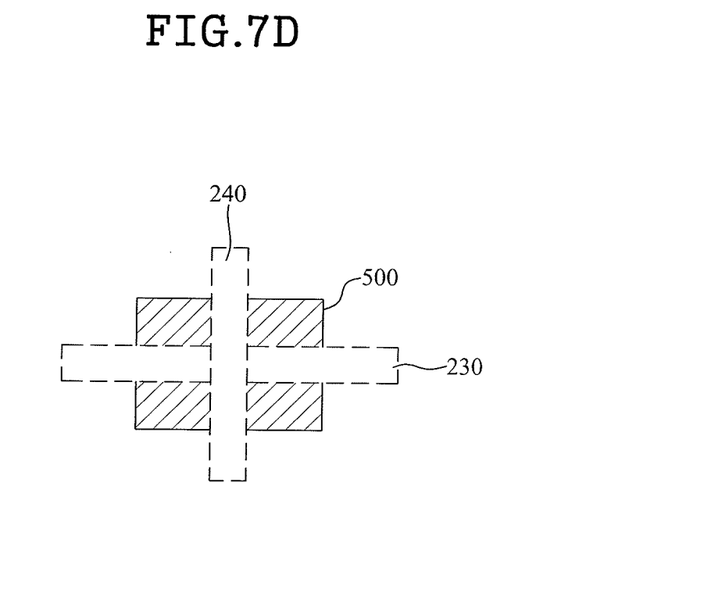

FIG. 7A to FIG. 7D are plane views illustrating the light-shielding layer 500 according to various embodiments of the present invention. The light-shielding layer 500 may be overlapped with the gate line 230 and the data line 240 as shown in FIG. 7A. The light-shielding layer 500 may be overlapped with the data line 240 only as shown in FIG. 7B. The light-shielding layer 500 may be overlapped with the gate line 230 only as shown in FIG. 7C. The light-shielding layer 500 may not be overlapped with the gate line 230 and the data line 240 as shown in FIG. 7D.

Also, various modifications such as a curved shape can be made in a shape of the light-shielding layer 500 without limitation to a rectangular shape.

Meanwhile, the light-shielding layer 500 is formed simultaneously with a light-shielding film formed in the lower substrate 200, whereby additional process steps for the light-shielding layer 500 can be prevented from being increased. This will be understood more easily with reference to FIG. 5B.

As shown in FIG. 5B, on the lower substrate 200 for the liquid crystal display device according to the fourth embodiment of the present invention, a light-shielding film 510, a buffer layer 202, a semiconductor layer 204, a gate insulating film 235, and a gate electrode 232 are sequentially formed. In other words, the fourth embodiment of the present invention is related to a top gate structure, in which the gate electrode 232 is located upper the semiconductor layer 204.

In case of the top gate structure, the light incident below the lower substrate 200 is irradiated to the semiconductor layer 204, whereby a leakage current may occur in the semiconductor layer 204. Accordingly, in order to prevent the light from being irradiated to the semiconductor layer 204, the light-shielding film 510 is formed below the semiconductor layer 204, i.e., on the lower substrate 200.

As described above, since the light-shielding film 510 is formed on the lower substrate 200 to shield the light, it can be formed in the periphery of the main column spacer 310 together with the light-shielding layer 500. In other words, the light-shielding layer 500 is formed of the same material as that of the light-shielding film 510 in the same layer.

Meanwhile, an interlayer insulating film 208 is formed on the gate electrode 232, and a source electrode 242, a drain electrode 244 and a data line 240 are formed on the interlayer insulating film 208. The source electrode 242 and the drain electrode 244 are respectively connected with a source region and a drain region of the semiconductor layer 204 through a contact hole formed in the interlayer insulating film 208.

A passivation film 245 is formed on the source electrode 242 and the drain electrode 244, and a pixel electrode 250 is formed on the passivation film 245. The pixel electrode 250 is connected with the drain electrode 244 through a contact hole formed in the passivation film 245.

Meanwhile, although not shown, a lower alignment film is formed on the pixel electrode 250.

Figure 6A:
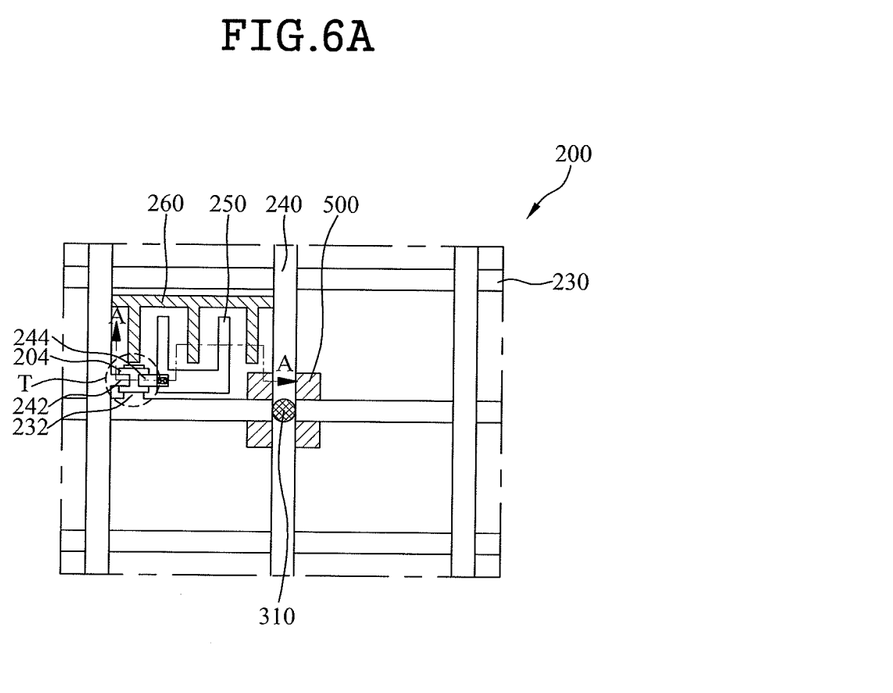
FIG. 6A is a plane view illustrating a lower substrate for a liquid crystal display device according to the fifth embodiment of the present invention.
Figure 6B:
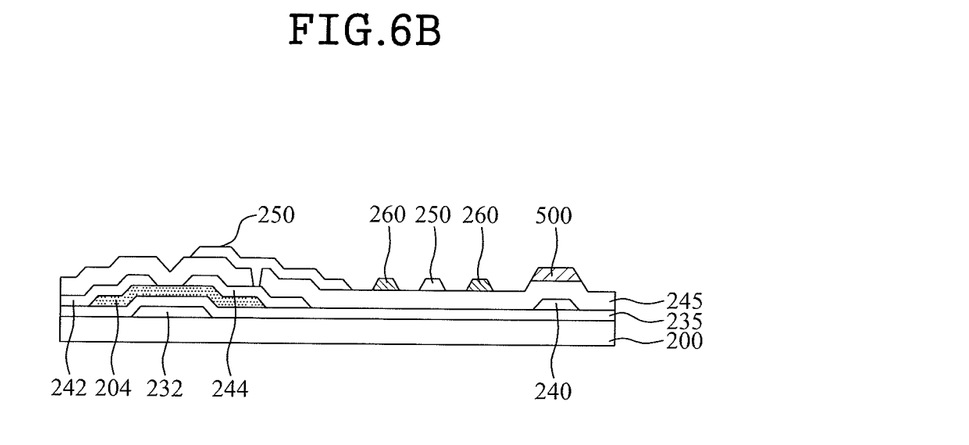
FIG. 6B is a cross-sectional view illustrating a liquid crystal display device corresponding to line A-A of FIG. 6A.

FIG. 6A is a plane view illustrating a lower substrate for a liquid crystal display device according to the fifth embodiment of the present invention, and FIG. 6B is a cross-sectional view illustrating a liquid crystal display device corresponding to line A-A of FIG. 6A.

In the same manner as the aforementioned embodiments, the liquid crystal display device according to the fifth embodiment of the present invention includes an upper substrate, a lower substrate, column spacers, and a liquid crystal layer. The upper substrate, the column spacers and the liquid crystal layer are formed in the same manner as those of the third or fourth embodiment. The lower substrate for the liquid crystal display device according to the fifth embodiment of the present invention will be described in detail with reference to FIGS. 6A and 6B.

As shown in FIG. 6A, on the lower substrate 200 for the liquid crystal display device according to the fifth embodiment of the present invention, a gate line 230 is arranged to cross a data line 240, thereby defining a pixel region. A thin film transistor T is formed to be connected with the gate line 230 and the data line 240. A pixel electrode 250 is formed in the pixel region to be electrically connected with the thin film transistor T. And, a common electrode 260 is arranged in parallel with the pixel electrode 250 to generate a horizontal electric field in the pixel region.

The main column spacer 310 is located in the portion where the gate line 230 crosses the data line 240. However, in the same manner as the fourth embodiment, the main column spacer 310 may be formed in a region of the gate line 230, which does not cross the data line 240, or may be formed in a region of the data line 240, which does not cross the gate line 230.

A separate light-shielding layer 500 is formed in the periphery of the main column spacer 310, whereby light leakage is prevented from occurring in the periphery of the main column spacer 310. Accordingly, the effective area of the pixel region adjacent to the main column spacer 310 becomes smaller than that of the pixel region which is not adjacent to the main column spacer 310.

In the same manner as the fourth embodiment, the light-shielding layer 500 may be formed as shown in FIG. 7A to FIG. 7D. And, various modifications such as a curved shape can be made in a shape of the light-shielding layer 500 without limitation to a rectangular shape.

The light-shielding layer 500 is formed simultaneously with a metal layer connected with the common electrode 260 to reduce resistance of the common electrode 260, whereby additional process steps for the light-shielding layer 500 can be prevented from being increased. In other words, since the common electrode 260 is located within the pixel region, it can be formed using a transparent conductive material to prevent transmittance from being deteriorated. In this case, a problem occurs in that resistance of the common electrode 260 is increased. Accordingly, in order to reduce resistance of the common electrode 260, the metal layer connected with the common electrode 260 can additionally be formed over the data line 240. As the metal layer is formed together with the light-shielding layer 500, the light-shielding layer can be formed without separate additional process. In this case, the light-shielding layer 500 is formed of the same material as that of the metal layer connected with the common electrode 260 in the same layer.

The lower substrate 200 for the liquid crystal display device according to the fifth embodiment of the present invention will be described in more detail with reference to FIG. 6B. The gate electrode 232 is formed on the lower substrate 200, and the gate insulating film 235 is formed on the gate electrode 232. Also, the semiconductor layer 204 is formed on the gate insulating film 235, and the source electrode 242 and the drain electrode 244 are formed on the semiconductor layer 204. Moreover, the data line 240 is formed on the gate insulating film 235.

A passivation film 245 is formed on the source electrode 242 and the drain electrode 244, and the pixel electrode 250 and the common electrode 260 are alternately formed on the passivation film 245.

Also, the light-shielding layer 500 is formed on the passivation film 245. The light-shielding layer 500 is formed on the passive film 245 over the data line 240.

Meanwhile, although not shown, a lower alignment film is formed on the pixel electrode 250.

The preferred embodiments of the present invention have been described as above. It is to be understood that the present invention is not limited to the aforementioned embodiments and various modifications can be made in the present invention in the range that technical spirits of the present invention can be applied thereto. For example, the liquid crystal display device of the present invention can be applied to various modes known in the art, such as a twisted nematic (TN) mode, a vertical alignment (VA) mode, an in plane switching (IPS) mode and a fringe field switching (FFS) mode. In this respect, various modifications can be made in detailed elements of the upper substrate 100 and the lower substrate 200, which constitute the liquid crystal display device according to the present invention.

As described above, according to the present invention, since the width of the light-shielding region in the periphery of the column spacer is greater than that of the light-shielding region where the column spacer is not formed, or a separate light-shielding layer is additionally formed in the periphery of the region where the column spacer is formed, even though the alignment film is damaged by the column spacer, light leakage can be prevented from occurring at the damaged portion.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
   an upper substrate and a lower substrate, which face each other;
   a liquid crystal layer formed between the upper substrate and the lower substrate; and
   a column spacer formed between the upper substrate and the lower substrate,
   wherein the column spacer includes a main column spacer that is in contact with both the upper substrate and the lower substrate and a sub column spacer that is in contact with the upper substrate but is not in contact with the lower substrate, a width of the main column spacer in a horizontal direction parallel, from a front view, to a direction the upper substrate extends is the same as a width of the sub column spacer and a height of the main column spacer in a direction perpendicular, from the front view, to the direction the upper substrate extends is different from a height of the sub column spacer,
   wherein the main column spacer overlaps, from a top view, a line-shape portion of a black matrix layer but does not overlap a rectangular shape portion, wherein the black matrix layer overlapping the main column spacer includes the line-shape portion and the rectangular shape portion that protrudes on both sides from the line-shape portion, the sub column spacer overlaps, from the top view, a line-shape portion without a rectangular shape portion of the black matrix layer protruding from the line-shape portion, the line-shape portion having the rectangular shape portion of the black matrix layer protruding on both sides from the line-shape portion overlaps at least one gate line, the line-shape portion having the rectangular shape portion of the black matrix layer protruding on both sides from the line-shape portion is separated from the line-shape portion without the rectangular shape portion of the black matrix layer protruding from the line-shape portion, and a width of the line-shape portion having the rectangular shape portion of the black matrix layer protruding on both sides from the line-shape portion is greater, from the front view and the top view, than a width of the line-shape portion without a rectangular shape portion of the black matrix layer protruding from the line-shape portion, and
   wherein the lower substrate includes gate and data lines thereon to define a pixel region, the gate lines including the at least one gate line, the gate and data lines crossing each other.

2. The liquid crystal display device of claim 1, wherein the upper substrate includes color filters between the black matrix thereon to display colors, and an effective area of the color filter adjacent to the main column spacer is smaller than an effective area of the color filter adjacent to the sub column spacer.

3. The liquid crystal display device of claim 1, wherein an effective area of the pixel region adjacent to the main column spacer is smaller than an effective area of the pixel region adjacent to the sub column spacer.

* * * * *